United States Patent
Young

(10) Patent No.: US 6,529,639 B1
(45) Date of Patent: Mar. 4, 2003

(54) MODULATION TRANSFER FUNCTION CHARACTERIZATION EMPLOYING PHASED SLIT RETICLE

(75) Inventor: James B. Young, Goleta, CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 08/531,019

(22) Filed: Sep. 20, 1995

Related U.S. Application Data

(63) Continuation of application No. 08/039,806, filed on Mar. 29, 1993, now abandoned, and a continuation-in-part of application No. 07/871,882, filed on Apr. 21, 1992, now abandoned.

(51) Int. Cl.$^7$ ................................................ G06K 9/36
(52) U.S. Cl. .................................... 382/276; 250/208.1
(58) Field of Search ................................ 382/296, 280; 250/206, 206.3, 208.1, 237 R, 237 G, 565; 359/559, 566, 569, 576; 356/304, 305

(56) References Cited

U.S. PATENT DOCUMENTS

| | | | | |
|---|---|---|---|---|
| 3,876,304 A | * | 4/1975 | Novak ..................... | 250/237 R |
| 4,433,911 A | * | 2/1984 | Sawada et al. ............. | 355/125 |
| 4,972,451 A | * | 11/1990 | Brok et al. ................ | 378/207 |
| 5,140,147 A | * | 8/1992 | Barnett .................... | 250/208.1 |
| 5,191,621 A | * | 3/1993 | Brok ........................ | 382/43 |

OTHER PUBLICATIONS

"A method to measure the MTF of digital x-ray systems", R. Sones et al., pp. 166–171, Med. Phys. 11(2), Mar./Apr. 1984.
"Optical Stimuli for High-Volume, Automated Testing of Two-Dimensional, HgCdTe Focal Plane Arrays", by T. E. Shrode, SPIE vol. 1686, 4/92.

* cited by examiner

*Primary Examiner*—Von J. Couso
(74) *Attorney, Agent, or Firm*—William C. Schubert; Glenn H. Lenzen, Jr.

(57) ABSTRACT

Apparatus and method for determining a modulation transfer function of a plurality of radiation detectors (12). The method includes a step of simultaneously illuminating, with a slit illumination source embodied within a phased slit reticle (16b'), a plurality of detector elements that are disposed within a localized area comprised-of rows and columns of a radiation detector array (10). The phased slit reticle has a two dimensional phase characteristic that is a function of a distance between adjacent detector elements. The method includes a further step of determining, from an electrical signal generated by the illuminated detector elements, a line spread function; and a step of determining, by taking a Fourier Transform of the determined line spread function, the modulation transfer function of the detector elements within the localized area.

18 Claims, 8 Drawing Sheets

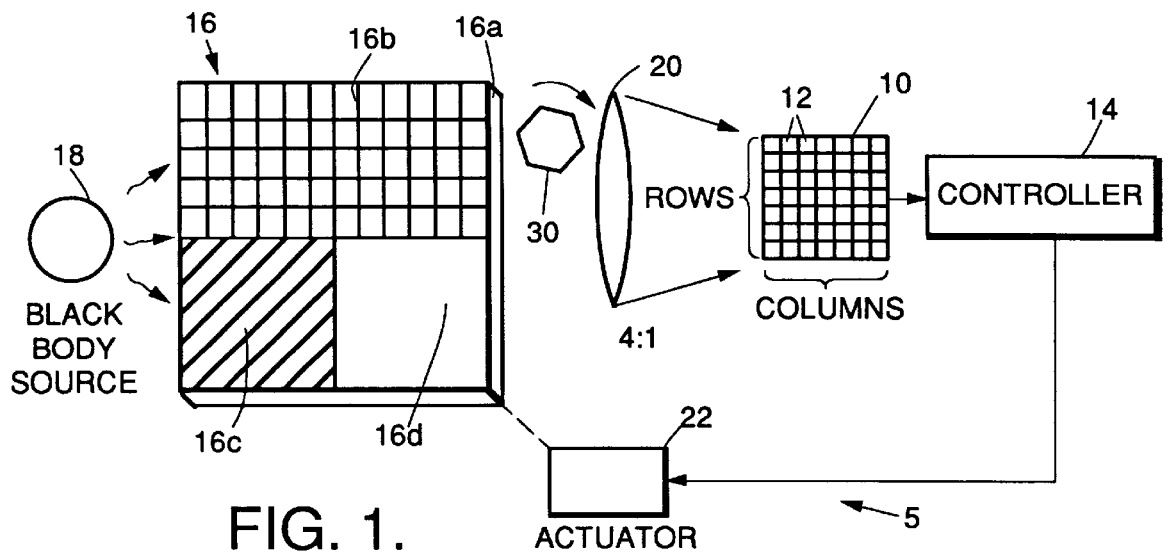
FIG. 1.
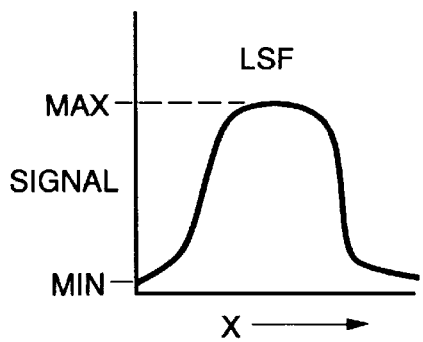
FIG. 2a.
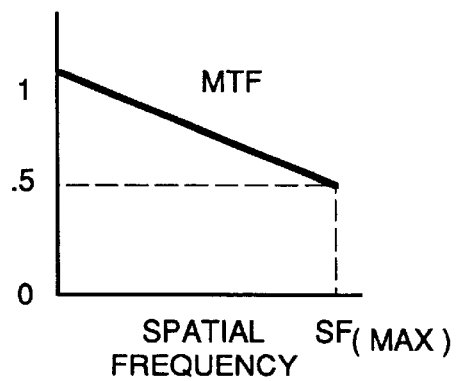
FIG. 2b.
FIG. 2c.
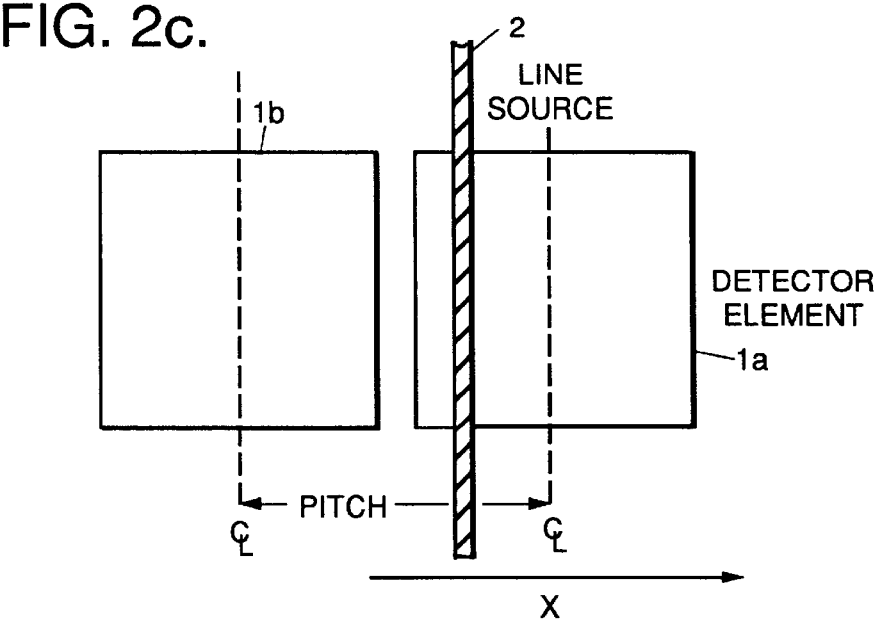

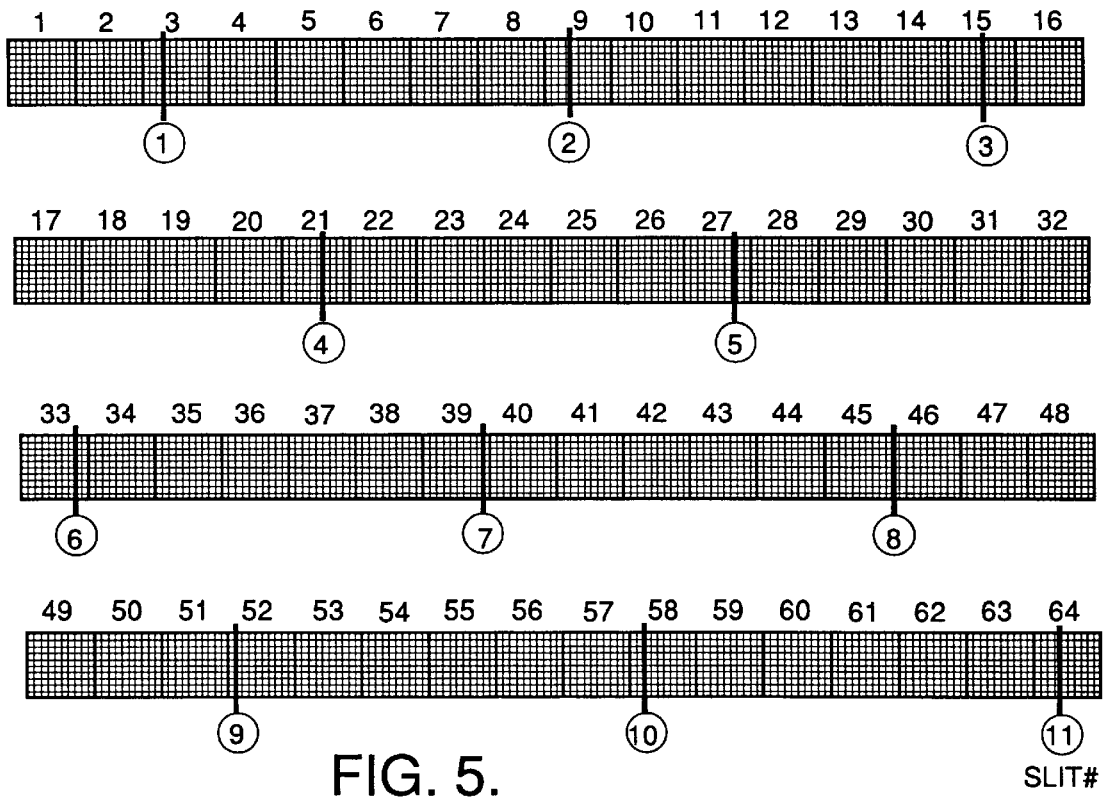
FIG. 5.
FIG. 10.
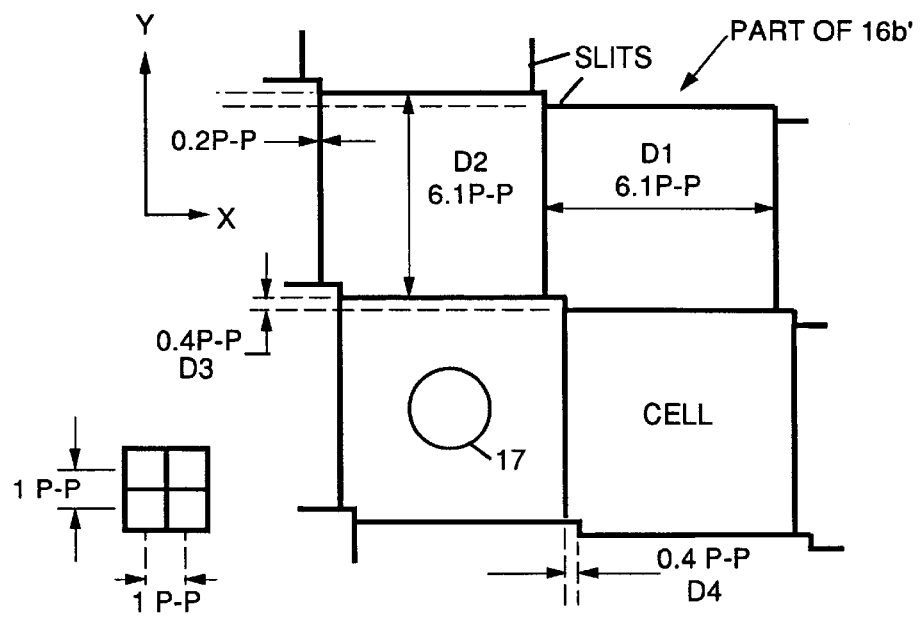

FIG. 9.
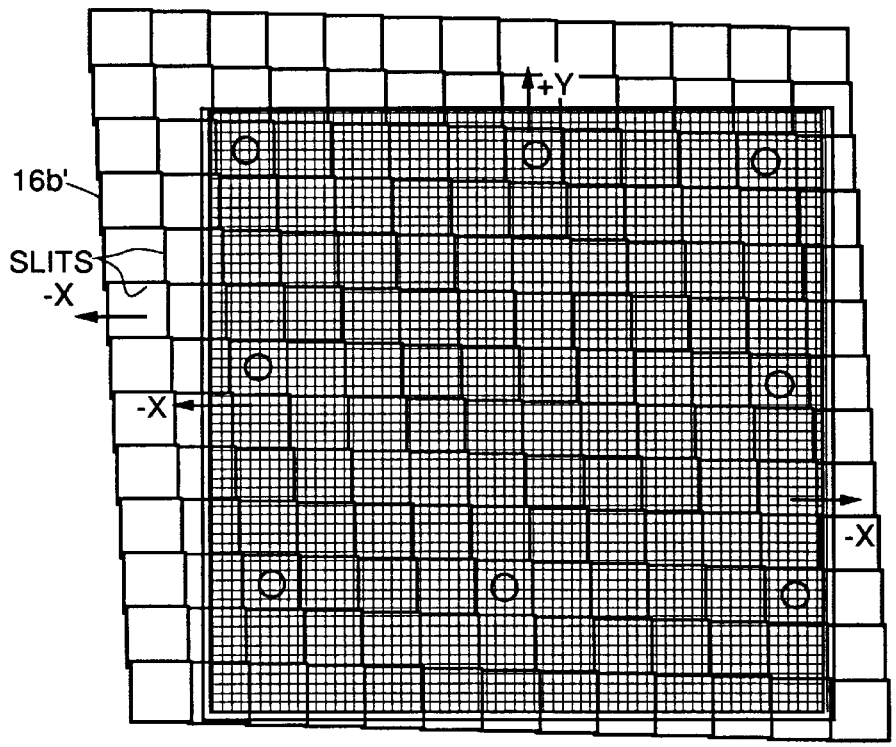
FIG,.11.
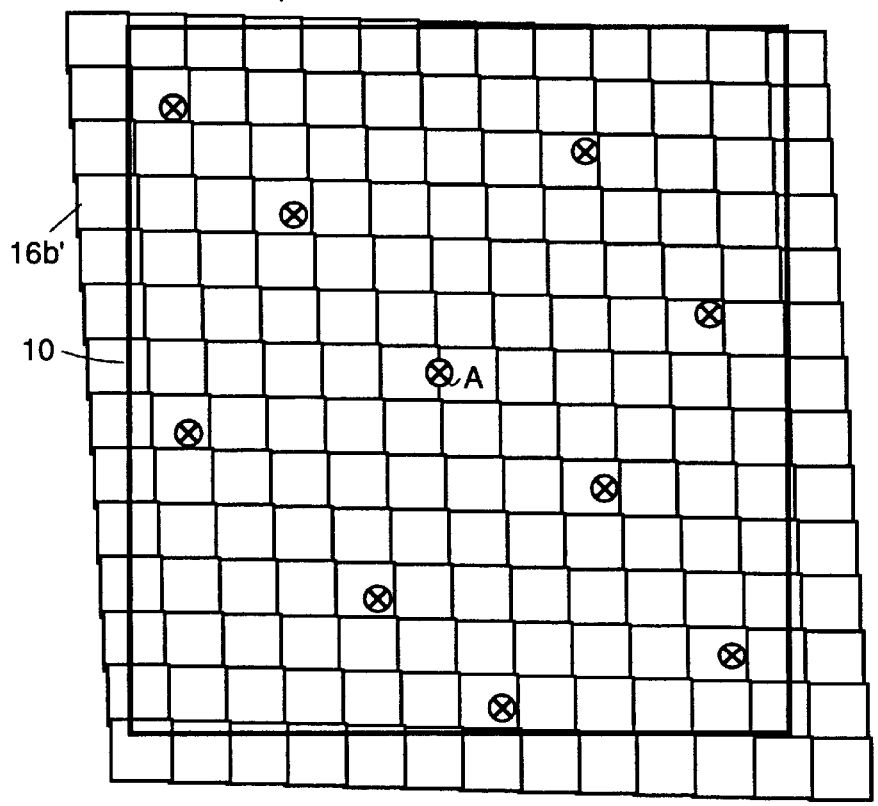

| ROWS | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|
| 20 | -0.9 | -1.9 | -2.9 | 2.2 | 1.2 | 0.2 | -0.8 | -1.8 | -2.8 |  | 1.3 | 0.3 | -0.7 | -1.7 | -2.7 |
| 21 |  |  |  |  |  |  |  |  |  |  |  |  |  |  |  |
| 22 |  |  |  |  |  |  |  |  |  |  |  |  |  |  |  |
| 23 |  |  |  |  |  |  |  |  |  |  |  |  |  |  |  |
| 24 |  |  |  |  |  |  |  |  |  |  |  |  |  |  |  |
| 25 |  |  |  |  |  |  |  |  |  |  |  |  |  |  |  |
| 26 | -0.5 | -1.5 | -2.5 |  |  | 1.6 | 0.6 | -0.4 | -1.4 | -2.4 |  | 1.7 | 0.7 | -0.3 | -1.3 | -2.3 |
| 27 |  |  |  |  |  |  |  |  |  |  |  |  |  |  |  |
| 28 |  |  |  |  |  |  |  |  |  |  |  |  |  |  |  |
| 29 |  |  |  |  |  |  |  |  |  |  |  |  |  |  |  |
| 30 |  |  |  |  |  |  |  |  |  |  |  |  |  |  |  |
| 31 |  |  |  |  |  |  |  |  |  |  |  |  |  |  |  |
| 32 | -0.1 | -1.1 | -2.1 |  |  | 2 | 1 | 0 | -1 | -2 |  | 2.1 | 1.1 | 0.1 | -0.9 | -1.9 |
| 33 |  |  |  |  |  |  |  |  |  |  |  |  |  |  |  |
| 34 |  |  |  |  |  |  |  |  |  |  |  |  |  |  |  |
| 35 |  |  |  |  |  |  |  |  |  |  |  |  |  |  |  |
| 36 |  |  |  |  |  |  |  |  |  |  |  |  |  |  |  |
| 37 |  |  |  |  |  |  |  |  |  |  |  |  |  |  |  |
| 38 | 2.3 | 1.3 | 0.3 |  |  | 2.4 | 1.4 | 0.4 | -0.6 | -1.6 |  | 2.5 | 1.5 | 0.5 | -0.5 | -1.5 |
| 39 |  |  |  |  |  |  |  |  |  |  |  |  |  |  |  |
| 40 |  |  |  |  |  |  |  |  |  |  |  |  |  |  |  |
| 41 |  |  |  |  |  |  |  |  |  |  |  |  |  |  |  |
| 42 |  |  |  |  |  |  |  |  |  |  |  |  |  |  |  |
| 43 |  |  |  |  |  |  |  |  |  |  |  |  |  |  |  |
| 44 | 2.7 | 1.7 | 0.7 |  |  | 2.8 | 1.8 | 0.8 | -0.2 | -1.2 |  | 2.9 | 1.9 | 0.9 | -0.1 | -1.1 |

MODULATION TRANSFER FUNCTION CHARACTERIZATION EMPLOYING PHASED SLIT RETICLE

CROSS-REFERENCE TO A RELATED PATENT APPLICATION

This is a continuation of application Ser. No. 08/039,806 filed Mar. 29, 1993 now abandoned.

This patent application is a continuation-in-part of commonly assigned and patent application Ser. No. 07/871,882, filed Apr. 21, 1992, entitled "Modulation Transfer Function Characterization Employing Phased Slit Reticle", by James B. Young now abandoned.

FIELD OF THE INVENTION

This invention relates generally to radiation detector array characterization methods and apparatus and, in particular, to methods and apparatus for determining a modulation transfer function (MTF) of a detector array.

BACKGROUND OF THE INVENTION

FIG. 2a depicts an example of a Line Spread Function (LSF) for a single square detector element 1a, as shown in FIG. 2c. The LSF is a plot of signal intensity output by the detector element 1a in response to a line source 2 that is translated across the detector element 1a. For illustrative purposes, the line source 2 is shown as being translated along an x-axis. From the LSF a MTF for the detector element 1a is determined, the MTF being depicted graphically in FIG. 2b.

The MTF is a qualitative measure of image quality. Ideally, the MTF is unity for a normalized spatial frequency of zero, and monotonically falls to 0.5 for a maximum spatial frequency of interest. The spatial frequency is a function of the detector pitch.

In an electrooptical system application MTF is typically a quantitative measure of image assessment. Image assessment is a function of a number of factors, including optical quality, diffraction effects, vibrational effects, and, for a finite sized detector element, a blurring induced by the size and non-uniformity across the detector element.

The MTF is a normalized Fourier Transform of the LSF. The normalization results in unity MTF at a spatial frequency of zero. The Nyquist spatial frequency for a staring-type detector array is the reciprocal of twice the detector pitch, where the detector pitch is the center to center spacing between two adjacent detector elements (1a and 1b). The detector elements 1a and 1b are two detector elements of an array of detector elements, such as a staring-type focal plane array (FPA). A typical MTF is a decreasing function as spatial frequency increases.

As employed herein, the Nyquist Frequency, for data defined at equal time intervals (or equal spatial intervals) t, is the frequency of a sine or cosine term with a period double the interval t. Frequencies greater than this amount are not uniquely detectable by spectral analysis.

As an example, for a detector array having a detector pitch of 0.061 mm and a detector width of 0.058 mm (a high fill factor), the Nyquist frequency for the detector array can be expressed as one divided by two times the detector pitch. For the instant example, this yields a spatial frequency of approximately 8.2 cycles/mm. Referring to FIG. 2b, the normalized MTF starts at unity for a spatial frequency of zero, and decreases to 0.5 at the maximum spatial frequency of interest of 8.2 cycles/mm.

Expressed differently, the MTF, for a given sinusoidal spatial frequency, is equal to a maximum detector signal minus a minimum detector signal, divided by the maximum detector signal plus the minimum detector signal.

The MTF is a commonly specified parameter for an optical system. For an optical system that includes relay or imaging optics and a two-dimensional detector array, the overall system MTF is a product of the MTF of the relay optics and the MTF of the detector array.

As such, it is important to accurately determine the MTF of a detector array so as to determine if the MTF of the system meets the specification.

Various techniques are known for determining the MTF of a two-dimensional detector array. These include the following approaches.

In a first approach analog signals output by the detector array are displayed on an oscilloscope screen. A square wave response (SWR) is obtained from:

$$SWR = (\text{max signal} - \text{min signal})/(\text{max signal} + \text{min signal}).$$

It should be noted that the MTF is applied to a sinusoidal response, whereas the SWR is a composite of a fundamental sinusoidal component plus higher harmonic components.

A second approach employs a histogram technique. A third approach produces sine wave MTF values. This is a computationally intensive method of constructing a fundamental and its harmonics from a data stream generated by the detector element in response to an illuminated square bar reticle pattern. This method uses an iterative, search optimization methodology. A fourth approach scans a phased knife edge across the detector element. The digitized data stream has one sample per dwell time. The data stream is reconstituted to give a knife edge response (KER). The KER is differentiated to produce a LSF. The normalized Fourier Transform of the LSF gives the sine wave MTF. A fifth approach uses a scanned phased slit source. The data stream is used to obtain a reconstituted LSF which is Fourier Transformed to obtain a sine wave MTF. Other standard test methods are employed when there are no limitations on sampling interval. For example, a single knife edge (or line source 2 as in FIG. 2c) is scanned across a detector producing a well populated KER (LSF). For this case the KER (LSF) is given directly by the data stream output by the detector.

Each of these conventional approaches suffers from one or more of the following disadvantages: a requirement for an accurate optical alignment of a phased slit reticle with the detector array; a requirement that relative motion be provided between the reticle and the detector array; an excessively long computation time; and a MTF characterization of but a single detector element, as opposed to a characterization of the detector array.

The invention disclosed in the above-referenced commonly assigned patent application Ser. No. 07/871,882 overcomes the problems of the prior art by providing method and apparatus for determining the MTF of a detector array, without requiring relative motion between the detector array and a reticle. The use of a phased slit reticle is disclosed, wherein the reticle has a pattern selected to enable the determination of LSF data from the radiation detectors of a row or a column of an array of radiation detectors. The MTF is then subsequently determined from the LSF data.

Although this technique provides superior results, for some applications it is desirable to measure the MTF in a more localized area of the array than that represented by a row or a column.

OBJECTS OF THE INVENTION

It is an object of this invention to provide method and apparatus for determining the MTF of one or more localized regions of a detector array, without requiring relative motion between the detector array and a reticle.

It is a further object of this invention to provide a phased slit reticle having a pattern selected to enable the determination of LSF data for a localized region of a radiation detector array, and to thus enable the determination of the MTF from the LSF data obtained from the localized region.

SUMMARY OF THE INVENTION

The foregoing and other problems are overcome and the objects of the invention are realized by a method and apparatus for determining the MTF of a detector array that employs a reticle pattern having a plurality of slits arranged in a predetermined pattern for providing a two dimensional phase difference between adjacent slits, the phase difference being a function of detector pitch. Relative motion between the reticle and a detector array under test is not required and, in addition, the alignment requirements are modest.

More specifically, the invention provides both apparatus and method for determining a modulation transfer function of a plurality of radiation detectors. The method includes a step of simultaneously illuminating, with a slit illumination source embodied within a phased slit reticle, a plurality of detector elements that are disposed along rows and columns of a radiation detector array. The phased slit reticle has a two dimensional phase characteristic that is a function of a distance between adjacent detector elements. The method includes a further step of determining, from an electrical signal generated by illuminated detector elements, a line spread function; and a step of determining from the line spread function, the modulation transfer function of the detector elements within a localized region of the radiation detector array.

The phased slit reticle has a first set of parallel slits that are equally spaced apart from one another by a distance (D1), and a second set of parallel slits that are equally spaced apart from one another by a distance (D2). The first set of slits and the second set of slits are orthogonally disposed one to another and define a two dimensional array of cells. The cells of adjacent columns of the two dimensional array of cells are staggered relative to another by an amount equal to a distance (D3). Furthermore, the cells of adjacent rows of the two dimensional array of cells are overlapped with one another by an amount equal to a distance (D4). This staggering and overlap of the reticle cells enables the LSF to be determined within localized areas or regions of pixels of two dimensional array of radiation detectors.

In accordance with a method of the invention a first step irradiates the detector array so as to obtain first reference signals. A next step provides the phased slit reticle PSR having a pattern characterized by a plurality of slits providing a two dimensional phase difference between adjacent slits, the specific phase difference being a function of detector pitch along both rows and columns of the detector array.

A next step irradiates the detector array through the PSR to obtain further signals. These further signals are normalized with respect to the first signals, and the method then determines those detector elements within rows and columns that have an orientation, with respect to the PSR, that is suitable for determining the LSF. Based on this determination detector elements (pixels) are selected from the determined rows and columns. The LSF is generated from a plurality of the selected detector elements that are simultaneously illuminated by the PSR. A further step takes a Fourier transform of the LSF to obtain the MTF performance.

BRIEF DESCRIPTION OF THE DRAWING

The above set forth and other features of the invention are made more apparent in the ensuing Detailed Description of the Invention when read in conjunction with the attached Drawing, wherein:

FIG. 1 is a block diagram of a detector measurement system that operates in accordance with the invention;

FIG. 2a is a graph showing a typical line spread function (LSF) of a detector element;

FIG. 2b is a graph showing an idealized modulation transfer function (MTF) for a detector element combined with the MTF of a diffraction limited optical system;

FIG. 2c illustrates a single detector element having a single slit pattern that is translated across the detector for generating the LSF waveform of FIG. 2a;

FIG. 5 illustrates a relationship between one row of detector elements of FIG. 1 and the phased slit reticle;

FIG. 9 illustrates the phased slit reticle of FIG. 8 superimposed upon the array of FIG. 7;

FIG. 10 shows a portion of the phased slit reticle of FIG. 9 and illustrates the phase relationship of slits in terms of pixel-to-pixel spacing;

FIG. 11 is a simplified version of FIG. 9 and illustrates a plurality of localized areas for which LSF data can be generated;

DETAILED DESCRIPTION OF THE INVENTION

Figure 3:
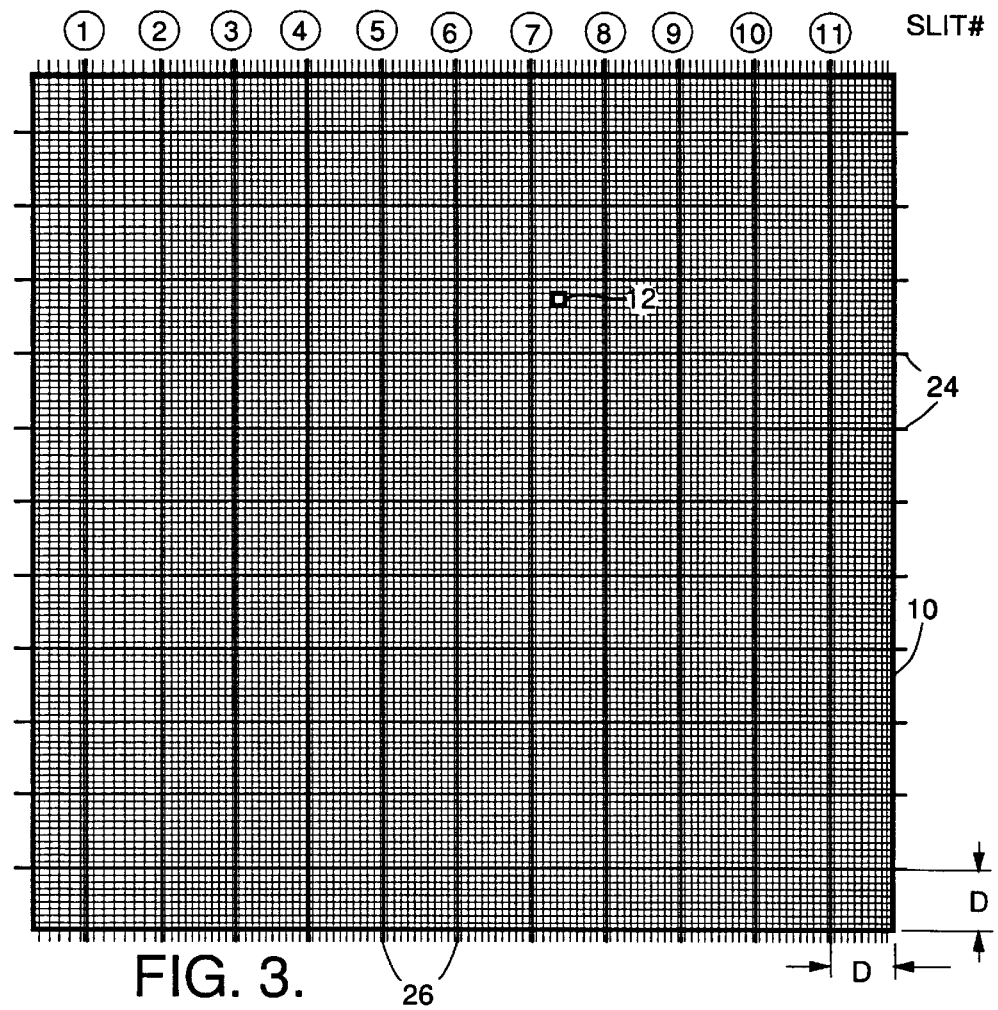
FIG. 3 top view of a two-dimensional detector array, not drawn to scale, having superimposed thereon a two-dimensional phased slit illumination pattern.

FIG. 1 is a block diagram illustrating a detector measurement system 5 that operates in accordance with the invention. A two-dimensional detector array 10 has a plurality of individual detector elements 12 organized in rows and columns. By example only, the array 10 has 64 detector elements by 64 detector elements. The detector array 10 is shown in greater detail in FIG. 7. An electrical output of detector array 10 is coupled to a controller 14 which measures the output of each detector element 12 in a conventional manner. So as to determine the MTF of the detector array 10 there is provided, in accordance with the invention, a phase slit reticle (PSR) 16. PSR 16 includes a transparent substrate 16a having, in a first region 16b, a regular grid pattern formed on a surface thereof. The grid pattern is formed in a manner described in detail below. In a second region 16c is an optically opaque layer, and in a region 16d only the transparent substrate 16a is present. A radiant energy source 18, which may be a black body source, is provided for illuminating the PSR 16. Interposed between the PSR 16 and the detector array 10 under test is a reduction optics system that is schematically shown as a lens 20. Lens 20 images one of the regions of the reticle 16, with a four to one reduction, upon a surface of the detector array 10. So as to image, at different times, the different regions of the PSR 16 an actuator 22 has an output coupled to the PSR 16 for translating same along x and y axes. The actuator 22 is controlled by controller 14.

During a test of the detector array 10 the array is preferably operated at its preferred operating temperature. By example, for a detector array comprised of HgCdTe radiation detectors, the array 10 is maintained at liquid nitrogen temperatures (77 K).

The controller 14 may be any suitable data processing device and includes conventional components, such as a display, keyboard, and a memory (not shown). The memory stores data and programs, including programs that implement the method of the invention.

FIG. 3 shows in greater detail the detector array 10 having the PSR 16 illumination pattern imaged thereon. It should be noted that FIG. 3 is not drawn to scale. The illumination pattern is indicated by the plurality of equally spaced horizontal and vertical parallel grid lines 24 and 26. The PSR 16, in the region 16b, has an optically opaque coating that is photolithographically processed to selectively remove the opaque coating so as to form a regular grid structure and to thus expose linear stripes of the underlying transparent substrate 16a. As such, in FIG. 3 the detector 10 is illuminated only through the plurality of orthogonally disposed slits.

For the illustrated embodiment the phase difference between adjacent slits is 0.1 times the detector element 12 pitch dimension. For the 64×64 staring array embodiment shown there are two basic requirements: with a phase of 0.1, ten slits are required, and eleven or more is desirable; and the distance between two adjacent slits must be large enough to reduce, to an acceptable level, cross coupling due to optical and detector effects.

Figure 4:
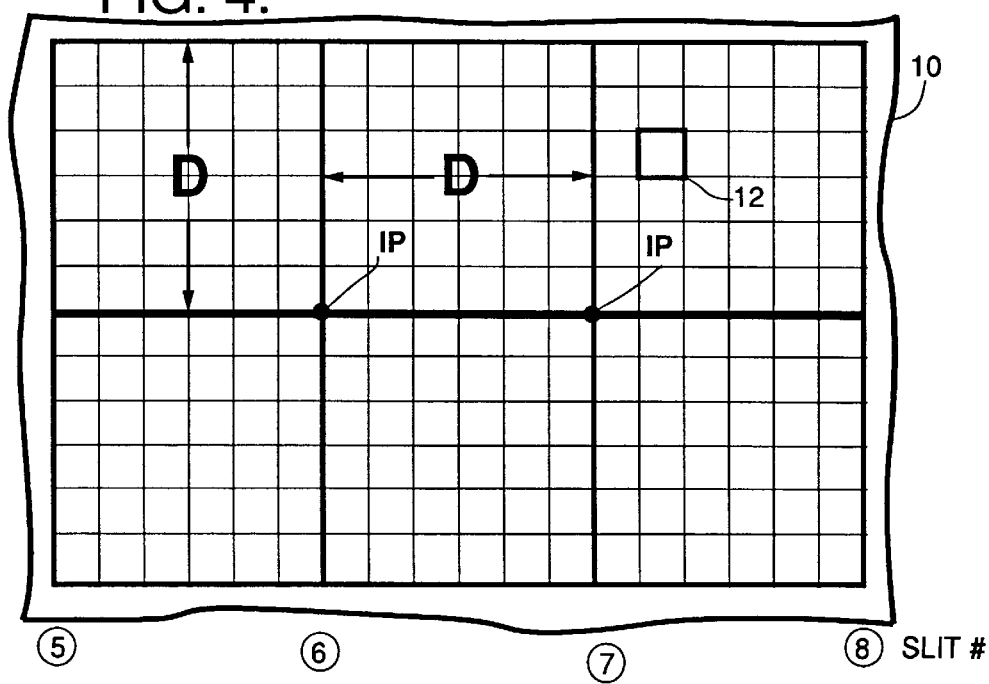
FIG. 4, not drawn to scale, is an enlarged view of a portion of the array and illumination pattern of FIG. 1.

FIG. 4, not drawn to scale, shows a small section of the 64×64 detector array 10 having the PSR illumination pattern superimposed thereon. Also shown is a single one of the detector elements 12. This configuration enables measurement of MTF in two orthogonal directions, as will be described.

FIG. 5 illustrates in greater detail the relationship between the eleven phased slits and one row of 64 detector elements 12. For ease of graphical illustration, the row of detector elements 12 has been "folded" four times so that the detector elements 12 of a single row, and the slits that illuminate same, are shown on one page. As can be seen, detector elements 3, 9, 15, 21, 27, 33, 39, 45/46, 52, and 58 are illuminated "directly" by one of the reticle slits. These correspond to LSF points $-5 \leq I \leq 5$ from Table 1. Signals from all other detectors in this row are also used. These correspond to I<−5 and I>5 (Table 1). Furthermore, these latter detector signals correspond to the LSF "wings" (low LSF response).

I is a parameter that expresses a number of points on the LSF curve. By example, in FIG. 2a the abscissa could be expressed in units of I.

It can further be noted that due to the phasing of the PSR 16 that each of the illuminated detector elements is illuminated at a different location. This corresponds to scanning the single slit 2 of FIG. 2c across the single detector element 1a, although the teaching of the invention achieves this effect with a stationary reticle and a stationary detector element. As is described in greater below, a composite LSF is determined from the plurality of illuminated and non-illuminated detector elements 12, from which the MTF is obtained.

As was stated, the phase between adjacent slits is, for this embodiment, 0.1 times the detector pitch. The physical spacing between adjacent parallel slits is 6.1 times the detector pitch. To achieve this illumination effect at the surface of the detector array 10, the PSR 16 slit patterns are provided a distance D apart, wherein $$D=(\text{detector pitch})\times(\text{reticle spacing})\times(\text{optical reduction})$$

or $$D=(0.061 \text{ mm})(6.1)(4)=1.488 \text{ mm}.$$

The width (W) of each slit in the region 16b is given by W=(0.061 mm) (0.2) (4)=0.0488 mm.

In Table 1 the relationships between reticle phase, LSF linear dimension, detector number, and slit number are tabulated.

TABLE 1

RELATIONSHIP BETWEEN PHASE, LSF LINEAR DIMENSION, DETECTOR NUMBER AND PHASED SLIT NUMBERS

| I | X(I) (μm) | N_det(r, C(I)) C(I) | Nslit |
|---|---|---|---|
| −20 | −122.00 | 17 | 3 |
| −19 | −115.90 | 23 | 4 |
| −18 | −109.80 | 29 | 5 |
| −17 | −103.70 | 35 | 6 |
| −16 | −97.60 | 41 | 7 |
| −15 | −91.50 | 47 | 8 |
| −14 | −85.40 | 53 | 9 |
| −13 | −79.30 | 59 | 10 |
| −12 | −73.20 | 4 | 1 |
| −11 | −67.10 | 10 | 2 |
| −10 | 61.00 | 16 | 3 |
| −9 | −54.90 | 22 | 4 |
| −8 | −48.80 | 28 | 5 |
| −7 | −42.70 | 34 | 6 |
| −6 | −36.60 | 40 | 7 |
| −5 | −30.50 | 46 | 8 |
| −4 | −24.40 | 52 | 9 |
| −3 | −18.30 | 58 | 10 |
| −2 | −12.20 | 3 | 1 |
| −1 | −6.10 | 9 | 2 |
| 0 | 0.00 | 15 | 3 |
| 1 | 6.10 | 21 | 4 |
| 2 | 12.20 | 27 | 5 |
| 3 | 18.30 | 33 | 6 |
| 4 | 24.40 | 39 | 7 |
| 5 | 30.50 | 45 | 8 |
| 6 | 36.60 | 51 | 9 |
| 7 | 42.70 | 57 | 10 |
| 8 | 48.80 | 63 | 11 |
| 9 | 54.90 | 8 | 2 |
| 10 | 61.00 | 14 | 3 |
| 11 | 67.10 | 20 | 4 |
| 12 | 73.20 | 26 | 5 |
| 13 | 79.30 | 32 | 6 |

TABLE 1-continued

RELATIONSHIP BETWEEN PHASE, LSF LINEAR DIMENSION, DETECTOR NUMBER AND PHASED SLIT NUMBERS

| 1 | X(1)<br>(μm) | N_det(r, C(1))<br>C(1) | Nslit |
|---|---|---|---|
| 14 | 85.40 | 38 | 7 |
| 15 | 91.50 | 44 | 8 |
| 16 | 97.60 | 50 | 9 |
| 17 | 103.70 | 56 | 10 |
| 18 | 109.80 | 62 | 11 |
| 19 | 115.90 | 7 | 2 |
| 20 | 122.00 | 13 | 3 |

Figure 6:
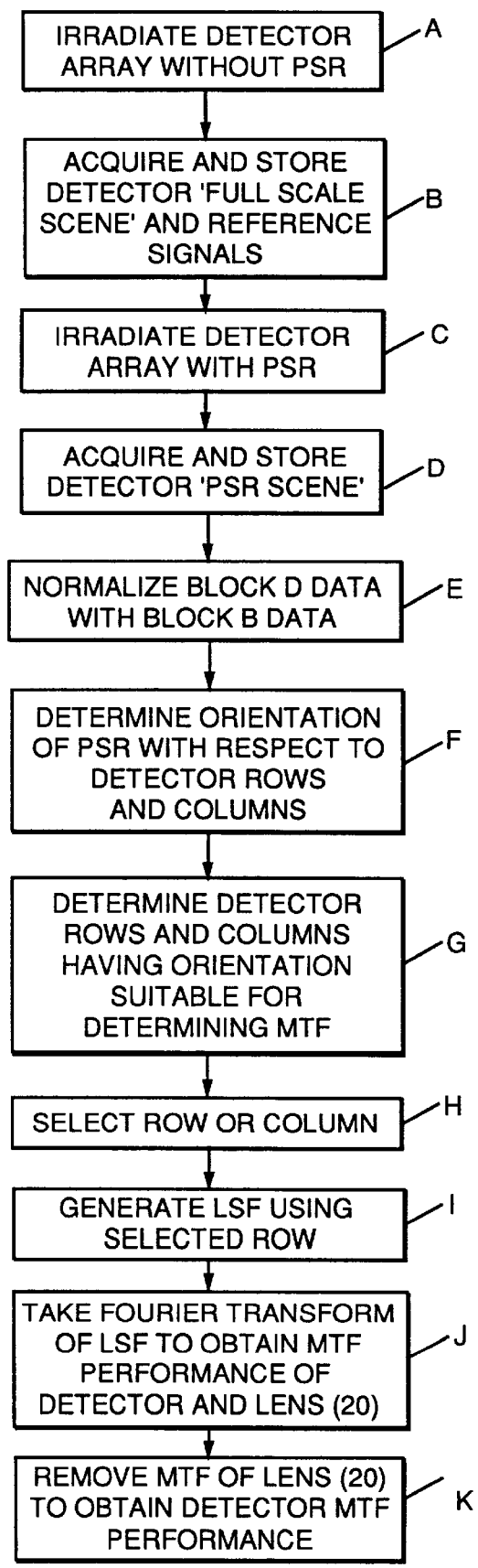
FIG. 6 is a flowchart that illustrates the steps of a method of determining the MTF for the embodiment illustrated in FIGS. 3, 4, and 5.

Based upon the foregoing a first method operates as set forth below. Reference is also made to the flow chart of FIG. 6.

LSF Construction

Blocks A and B: Data is required to normalize the detector array signal output. The detector array 10 is first irradiated through the PSR transparent region 16d with the radiant energy source 18. There is obtained, by the controller 14, a detector array 10 "full scale scene" reference signal (Sig_fs (r,c)) for each detector element 12 of each row (r) and each column (c). Next, the PSR opaque region 16c is interposed between the source 18 and the detector array 10. There is then obtained a detector array 10 "dark" reference signal (Sig_ref (r,c)) for each detector element 12 of each row and each column. These reference signals are stored for subsequent use.

Blocks C and D: The region 16b of the PSR 16 is inserted within the optical path and associated reticle slit scene (Sig_ret (r,c)) are obtained for each detector element 12.

Block E: The slit scene and reference signals are normalized with respect to the first set of reference signals obtained at Block B. One suitable technique is expressed in the nested loop:

10 For r=1 to 64 ! Array row
20 For c=1 to 64 ! Array column
30 Sig_norm (r,c)=(Sig_ret(r,c)−Sig_ref(r,c))/(Sig_fs (r,c)−Sig_ref(r,c))
40 next c
50 next r Block F: Next, a determination is made of the orientation of the phased slit pattern with respect to the detector array 10 rows and columns. As an example, this is accomplished by the following steps:

a. Find the maximum value of Sig_norm(r,c), and denote as Sig_norm_max.
b. Find all detector elements 12 that have Sig_norm(r,c) >(0.65)×(Sig_norm_max).
c. Detector elements 12 located in step (b) indicate intersection points (IP, FIG. 4) of the phased slit reticle. Not all intersection points are represented, but a sufficient number are located so as to enable a technique to obtain a good approximation of the phased slit and detector array 10 orientation.

The location of intersection points in accordance with the above algorithm gives the PSR to detector array orientation to within ±1/2 detector spacing.

The approximate orientation of the PSR to detector array is useful to determine so that when computing MTF for a row (or column) of detectors, the selected row (or column) does not "receive" appreciable energy emanating from slits that are parallel to the row (or column). Specifically, the row (or column) is preferably located midway (±1 detector spacing) between the two nearest parallel slits.

Block G: After determining the orientation of the phased slit pattern with respect to the detector array 10, a next step determines which rows and columns of detector elements may be used to generate the MTF. The same technique applied above in step (C) is employed to determine the suitable rows and columns.

Block H: Next, a row (or column) is selected and processed by the steps of:

a. denote the row as r1;
b. search the detector elements 12 of the selected row (or column) with Sig_norm(r1,c) for $1 \leq c \leq 64$ to identify detector elements having a maximum signal; and
c. denote the detector elements 12 having maximum signal values as Sig_norm(r1,cmax).

Block I: A next step generates an LSF using the denoted detector elements for row r1. For this embodiment, the LSF includes 51 points, and corresponds to an LSF with a linear extent (X) of 6.1 times the detector pitch.

The LSF is determined in accordance with:

500 For 1=−25 to 25
510 C(l)=Cmax+6*l
520 1 f l=0 then GO TO 590
530 1 f l>0 then GO TO 570
540 1 f C (l)<1 then C (l)=C (l)+61
550 1 f C (l)<1 then C (l)=C (l)+61
560 GO TO 590
570 1 f C (l)>64 then C (l)=C (l)−61
580 1 f C (l)>64 then C (l)=C (l)−61
590 X (l)=l*0.1*61 ! units in μm
600 L sf (l)=Sig_norm (r1, C (l))
610 Next 1

Block J: After determining the LSF the Fourier Transform of the LSF is taken at selected spatial frequencies (Fs) to obtain the MTF. The result is the MTF (Fs) performance of a selected row (or column) of the detector array 10. The MTF(s) are obtained in accordance with:

$$MTF(s) = \frac{\left(\left(\sum Lsf(l)\mathrm{Cos}(2\pi FsX(l))\Delta X\right)^2 + \left(\sum Lsf(l)\mathrm{Sin}(2\pi FsX(l))\Delta X\right)^2\right)^{1/2}}{\sum Lsf(l)\Delta X}$$

where X corresponds to displacement along the translation axis, as in FIG. 2c, and delta X is an integration increment.

In accordance with the example given previously, for a detector array having a detector pitch of 0.061 mm and a detector width of 0.058 mm (a high fill factor), the Nyquist frequency for the detector array is expressed as one divided by two times the detector pitch. This yields a spatial frequency of approximately 8.2 cycles/mm. The selected spatial frequencies (Fs) thus lie between zero and 8.2 cycles/mm.

After having obtained the MTF of the detector array 10, plus optical relay 20, as described in detail above, the detector array 10 MTF is obtained (Block K) by dividing the combined MTF by the optical relay 20 MTF (obtained in a separate characterization). The resultant MTF is multiplied by an MTF obtained separately for an optical system to be coupled to the detector array. The product of the two MTFs is the predicted overall optical system MTF.

Although described in the context of a 64×64 element array it should be realized that the foregoing teachings are readily extendable to the determination of arrays larger than 64×64 elements. Also, the foregoing teachings may be employed to determine the MTF of a linear array having one row by n columns.

Also, the foregoing teachings may be employed to determine the MTF of other than the staring type array described above. That is, the PSR 16 may be used with a detector array operated in accordance with a Time Delay Integration (TDI) readout technique. This is accomplished by providing a scanning mirror 30 that is positioned within the optical path between the PSR 16 and the detector array 10. The same PSR 16 geometry is employed as is depicted in FIG. 3. During use, the scanning mirror 30 scans the reticle pattern across the detector array 10 in a timed relationship with the TDI readout. Preferably, the scanning mirror 30 moves the reticle illumination pattern across a detector element 12 with a velocity consistent with the TDI rate. For example, if the TDI period is one millisecond, the scanning mirror 30 scans the reticle illumination pattern across the detector element 12 within a one millisecond period. Although relative motion occurs between the reticle pattern and the detector array, a plurality of detector elements are still simultaneously slit illuminated as described above in relation to the staring array embodiment.

Also, although described in the context of a system that employs 10 phase slit elements, more or less than this number could be used. By example, the phase difference between adjacent slits may be 0.05, as opposed to 0.1, and a minimum of 20 phase slit elements are employed to determine the LSF. In general, the method described above may employ any combination of phase value between two adjacent slits times the number of phase slits available, so long as the product is equal to one or greater.

Having thus described a method and apparatus that enables the MTF to be determined from pixels disposed along a row or a column of an array of radiation detectors, a description is now made of a further embodiment of the invention that enables the MTF to be determined at one or more localized areas, wherein each localized area includes a plurality of pixels that are disposed along rows and columns of the array. This embodiment of the invention employs a reticle 16' that is provided with a pattern having two dimensional phase relationships. A portion 16b' of the reticle 16' is illustrated in FIG. 8.

Figure 7:
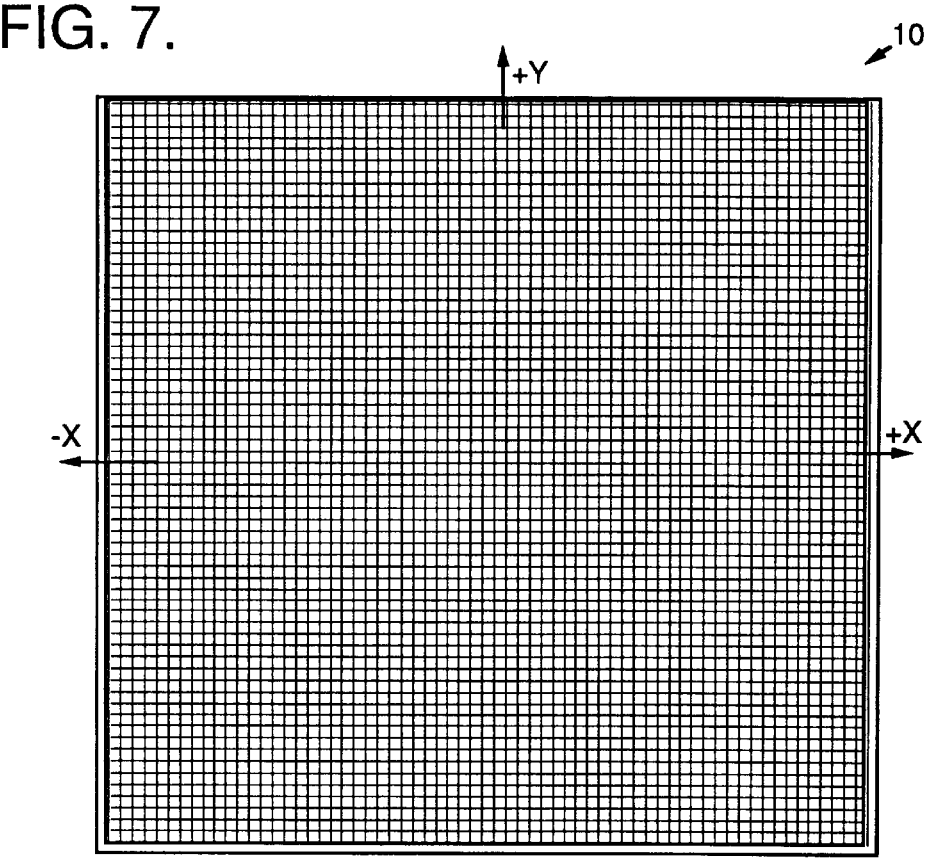
FIG. 7 illustrates a top view of a 64×64 array of radiation detector elements that is useful in describing a second embodiment of the invention.
Figure 8:
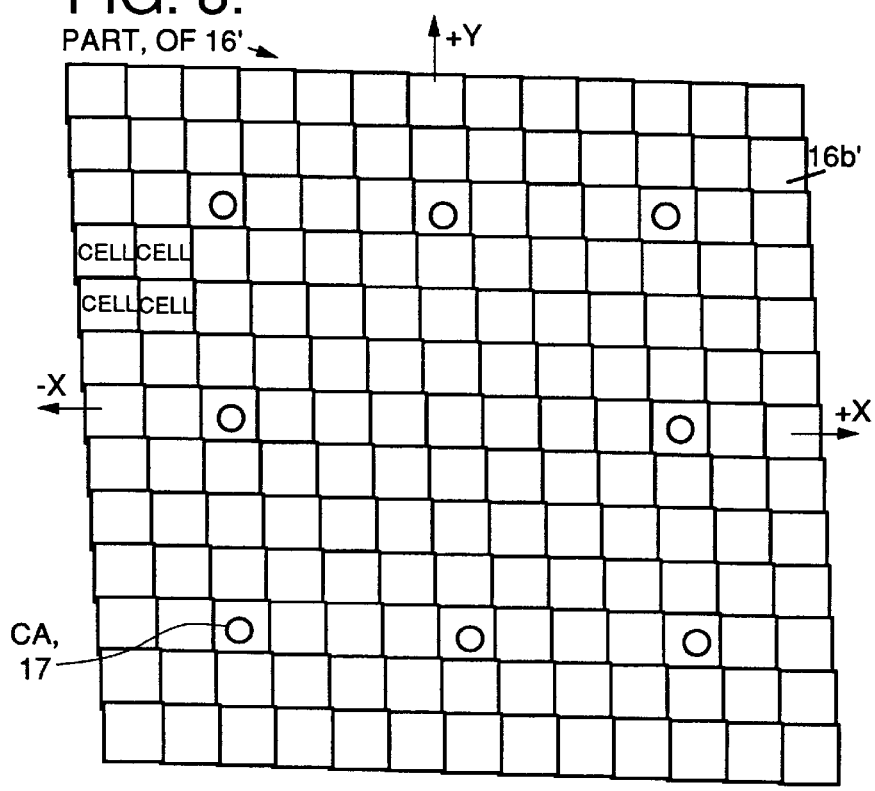
FIG. 8 is a top view of a phased slit reticle in accordance with the second embodiment of the invention.

Although not shown in FIG. 8, the reticle 16' includes an area 16d' having a transparent opening that enables the array 10 of FIG. 7 to be illuminated with an extended source, and a second area 16c' that is an opaque region. These two areas permit the detector array sensitivity to be calibrated, as described above with respect to the regions 16d and 16c of the PSR 16. The third area of the reticle 16' is the phased slit reticle 16b' that is constructed in accordance with this embodiment of the invention.

Referring also to FIG. 10, it can be seen that the phased slit reticle 16b' has a first set of parallel slits that are equally spaced apart from one another by a distance (D1), and a second set of parallel slits that are equally spaced apart from one another by a distance (D2). The first set of slits and the second set of slits are orthogonally disposed one to another and define a two dimensional array of cells. The cells of adjacent columns of the two dimensional array of cells are staggered relative to another by an amount equal to a distance (D3). Furthermore, the cells of adjacent rows of the two dimensional array of cells are overlapped with one another by an amount equal to a distance (D4). This staggering and overlap of the reticle cells enables the LSF to be determined within localized areas or regions of pixels of the array 10, and is described in greater detail below. The phased slit reticle 16b' also includes a plurality of circular apertures (CA) 17 which are employed during a rotational alignment of the phased slit reticle 16b' to the detector array 10.

Figures 13, 14:
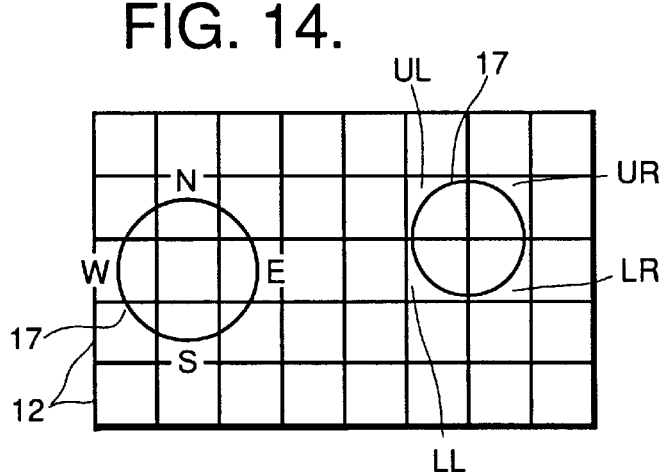
FIG. 13 depicts exemplary contents of a look-up table useful in determining the LSF for the reticle/array combination of FIG. 11.
FIG. 14 illustrates two exemplary placements of circular apertures with respect to pixels of a detector array.

FIG. 14 illustrates two exemplary placements of the circular apertures 17 with respect to pixels 12 of the detector array 10. The circular apertures are located with respect to the phased slit reticle patterns such that they are useful during a two-level alignment method. First, the clear apertures are employed to preliminarily align the detector array 10 to the phased slit reticle 16b' to within plus or minus two pixels. Secondly, the clear apertures 17 are used to fine tune the prelimary alignment by obtaining symmetry of pixel outputs that surround the circular apertures. For example, when employing the circular aperture placement shown on the left of FIG. 14, the outputs from the pixels designated N, E, S, and W are measured, and the phased slit recticle 16b' is controllably positioned with the actuator 22 (FIG. 1) until substantially equal signal amplitudes are output by these four pixels. When employing the circular aperture placement shown on the right of FIG. 14, the outputs from the pixels designated UL, UR, LR, and LL are measured, and the phased slit recticle 16b' is controllably positioned with the actuator 22 until substantially equal signal amplitudes are output by these four pixels.

FIG. 9 illustrates the superposition of the phased slit reticle 16b' on the detector array 10. It should be remembered when viewing FIG. 9 that the slits are actually transparent, while the region (cell) between slits is opaque.

FIG. 10 illustrates the phase relationships of the slits in terms of pixel to pixel (P-P) spacing. In FIG. 10 four detector elements or pixels of the array 10 are illustrated for reference purposes. As can be seen, for the 64×64 array 10 of FIG. 7 the (P-P) spacing between two adjacent pixels along the x-axis is identical to the (P-P) spacing between two adjacent pixels along the y-axis. In accordance with this embodiment of the invention, the distance between two adjacent slits along both the x-axis and the y-axis is a function of the (P-P) spacing, or 6.1 P-P. The width of each slit is also a function of the P-P spacing, or 0.2 P-P. Furthermore, the overlap and staggering of adjacent reticle cells is also a function of the (P-P) spacing, or 0.4 P-P.

As in the embodiment of the PSR 16 described previously, the dimensions of the phase slit reticle 16b' are determined also as a function of the power of the reducing optic 20, if any, that is interposed between the reticle 16' and the array 10 under test.

It should be noted that the various dimensions that are expressed in P-P spacing are exemplary. The specific values shown in FIG. 10 were selected to optimize the determination of the LSF for the 64×64 array 10 having equal spacing between vertically and horizontally disposed pixels. By example, the dimension of 0.4 P-P spacing could be instead 0.3 P-P spacing, although the LSF determination would not be optimized. In like manner the dimension 6.1 P-P spacing could be, by example, 7.1 P-P spacing or 8.1 P-P spacing.

Preferably, the various dimensions that define the geometry of the phased slit reticle 16b' are a function of the spacing or pitch between adjacent pixels of a radiation detector array that is to be tested or characterized with the phased slit reticle.

FIG. 11 illustrates a plurality of local areas of the array 10 for which LSF data can be generated, and thus MTF performance calculated. Each such local area is comprised of a plurality of pixels, and the center of each local area is indicated with the symbol ⓧ. The exact number and locations of these local areas are dependent upon the superposition of the phased slit reticle 16b' on the two dimensional detector array 10.

Figure 12:
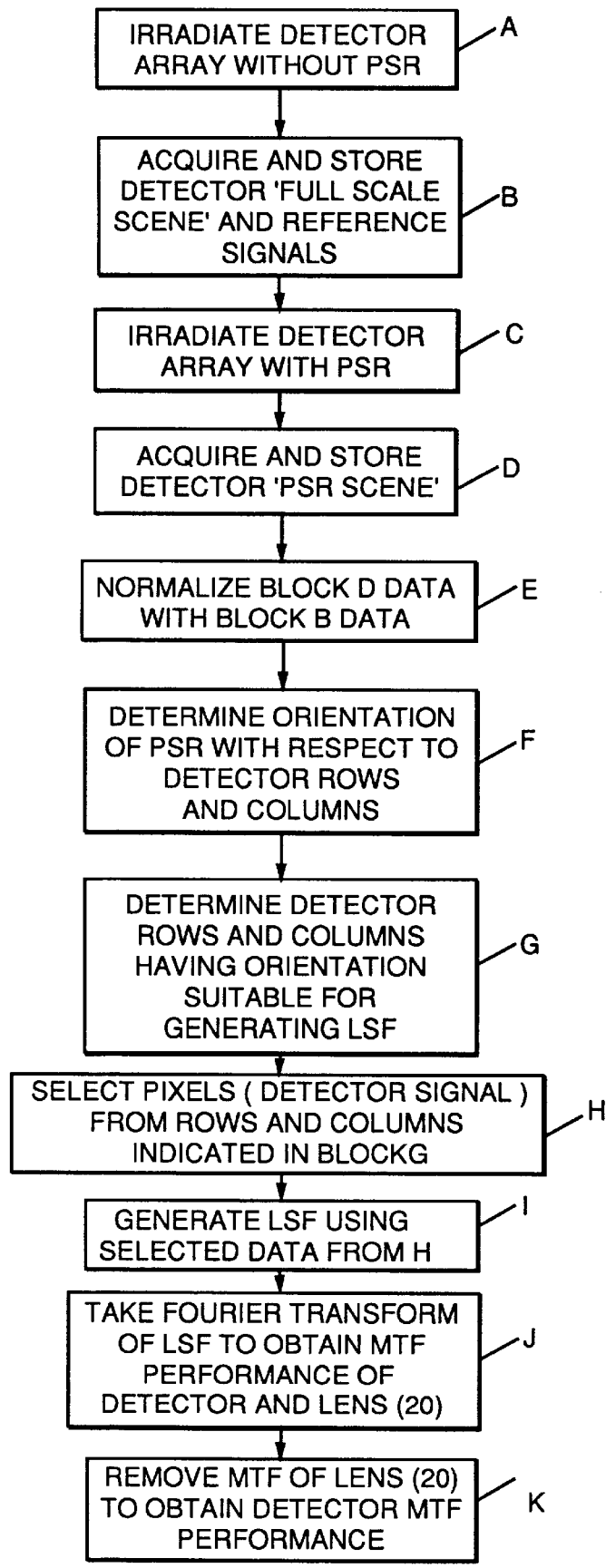
FIG. 12 is flow chart that illustrates a method of the second embodiment of the invention.

The acquisition of data is in general similar between the embodiment described with respect to FIGS. 1–6 and the phased slit reticle 16b' pattern described above. FIG. 12 is a flow chart that depicts the data acquisition method of this embodiment of the invention. Blocks A through F, J and K function as previously described with respect to FIG. 6. Blocks G, H, and I of FIG. 12 function differently.

In Block G the method determines the detector array rows and columns having an orientation suitable for generating the LSF. In Block H the method selects pixels (detector signals) from the rows and columns indicated in Block G. In Block I the method generates the LSF using selected data from Block H.

Two methods for determining the LSF are available for use with the phased slit reticle 16b'. The first method uses a look-up table and the second method employs a numeric computation. Both methods require that the center location (R0, C0) of the LSF be known, where R0 and C0 are the detector array row and the detector array column location, respectively. FIG. 13 illustrates the content of an exemplary look-up table for the case of R0=32 and C0=31. The value of zero at this row and column location in the look-up table corresponds to the center of the local area of pixels (x) designated "A" in FIG. 11. In the look-up table of FIG. 13 the listed values are the spatial dimensions (in pixel units). The detector signal obtained from each identified pixel location is the amplitude of the LSF at that spatial dimension, as indicated by the look-up table or the numeric computation.

Table 2 illustrates the relative location of LSF centers relative to one another across the array 10.

TABLE 2

RELATIVE LOCATIONS OF LSF CENTERS

| R0,C0 | R0,C0 | R0,C0 |
|---|---|---|
|  | 6,5 |  |
|  | 19,18 | 14.5,42 |
| 36.5,7 | 32,31 (A) | 27.5,55 |
| 49.5,20 | 41,44 |  |
| 62.5,33 | 58,57 |  |

The 10 LSF centers listed in Table 2 correspond to centers of the 10 localized areas (x) that are depicted in FIG. 11.

The general computational technique is given by:

$$\phi\text{horiz}=IP(((R-R0)+SGN(R-R0)*2.5-0.4/6.1*(C-C0))/6)*0.4+ IP((C-C0+SGN(C-C0)*2.5)/6)*6.1+C0-C$$

and $$\phi\text{vert}=IP(((C-C0)+SGN(C-C0)*2.5-0.4/6.1*(R-R0)/6)*0.4+ IP((R-R0+SGN(R-R0)*2.5)/6)*6.1+R0-R,$$

where

φhoriz and φvert are the spatial dimension of the horizontal and the vertical LSF, respectively;

IP represents an integer part;

R and C are the row and column, respectively, of the detector pixel position;

R0 and C0 are the row and column, respectively, of the center location of the LSF; and SGN( ) indicates the use the sign of the quantity in ( ).

Either the look-up table approach of FIG. 13 or the general calculation shown above can be employed in Block G. Next, Block H is executed using the information determined from Block G, and then Block I is executed. In Block I, the signal measured at the selected pixels is the amplitude of the LSF.

Although the invention has been described in the context of specific embodiments thereof, it will be understood by those skilled in the art that changes in form and details may be made therein without departing from the scope and spirit of the invention.

What is claimed is:

1. A method for determining a modulation transfer function of a radiation detector array comprised of detector elements that are arranged in rows and columns, comprising the steps of:

simultaneously illuminating, with a phased slit reticle, at least one plurality of detector elements that are disposed within an area along rows and columns of the radiation detector array, the phased slit reticle comprised of an opaque substrate having a plurality of transparent linear features defining at least a first set and a second set of parallel slits, the first set and the second set of parallel slits forming a grid-like pattern, said phased slit reticle having the first set of parallel slits that are equally spaced apart from another by a distance D1, the phased slit reticle further having the second set of parallel slits that are equally spaced apart from one another by a distance D2, wherein the first set of slits and the second set of slits are orthogonally disposed one to another for defining a two dimensional array of cells, wherein the cells of adjacent columns of the two dimensional array of cells are staggered relative to another by an amount equal to a distance D3, and wherein the cells of adjacent rows of the two dimensional array of cells are overlapped with one another by an amount equal to a distance D4, wherein the value of each of D1, D2, D3 and D4 is a function of the distance between two adjacent detector elements, each of the slits of the first and second set having a width that, when imaged upon the detector array, is substantially less than a width of a single detector element, the phased slit reticle further having a two dimensional phase characteristics between adjacent slits of the first set and the second set that is a function of a distance between adjacent detector elements;

determining, from an electrical signal generated by the illuminated detector elements, a line spread function; and determining, from the line spread function, the modulation transfer function of the radiation detector array within the area.

2. A method as set forth in claim 1 wherein the values of D1 and D2 are each equal to 6.1 times the spacing distance between two adjacent detector elements, multiplied by a reduction factor employed in imaging the phase slit reticle upon the detector array, and wherein the values of D3 and D4 are each equal to 0.4 times the spacing distance between two adjacent detector elements, multiplied by the reduction factor employed in imaging the phase slit reticle upon the detector array.

3. A method as set forth in claim 1 wherein the step of determining the modulation transfer function includes a step of obtaining a Fourier Transform of the line spread function at selected spatial frequencies.

4. A method as set forth in claim 1 wherein the step of determining the modulation transfer function includes a step of effectively removing a modulation transfer function of an optical element that is interposed between the plurality of detector elements and the slit illumination source.

5. Apparatus for determining a modulation transfer function of a radiation detector array comprised of detector elements that are arranged in rows and columns, comprising:

means for simultaneously illuminating at least one plurality of detector elements that are disposed within an area along rows and columns of the radiation detector array, the illuminating means including a phased slit reticle comprised of an opaque substrate having a plurality of transparent linear features defining first and second sets of parallel slits the first set and the second set of parallel slits forming a grid-like pattern and wherein said first set of parallel slits are equally spaced apart from one another by a distance D1; and said set of parallel slits are equally spaced apart from one another by a distance D2;

wherein the first set of slits and the second set of slits are orthogonally disposed one to another for defining a two dimensional array of cells, wherein the cells of adjacent columns of the two dimensional array of cells are staggered relative to another by an amount equal to a distance D3, and wherein the cells of adjacent rows of the two dimensional array of cells are overlapped with one another by an amount equal to a distance D4, wherein the value of each of D1, D2, D3 and D4 is a function of the distance between two adjacent detector elements, each of the slits of the first and second set having a width that, when imaged upon the detector array, is substantially less than a width of a single detector element, the slit illumination source further having a two dimensional phase characteristic between adjacent slits of the first set and the second set that is a function of a distance between adjacent detector elements;

means for determining, from an electrical signal generated by the illuminated detector elements, a line spread function and, from the line spread function, the modulation transfer function of the radiation detector array within the area.

6. Apparatus as set forth in claim 5 wherein the values of D1 and D2 are each equal to 6.1 times the spacing distance between two adjacent detector elements, multiplied by a reduction factor employed in imaging the phase slit reticle upon the detector array, and wherein the values of D3 and D4 are each equal to 0.4 times the spacing distance between two adjacent detector elements, multiplied by the reduction factor employed in imaging the phase slit reticle upon the detector array.

7. Apparatus as set forth in claim 5 and further including:

an illumination source disposed for illuminating the phased slit reticle; and an optical system disposed for receiving illumination that passes through the phased slit reticle, the optical system including a reduction optical element for focusing the illumination that passes through the phased slit reticle onto the detector elements.

8. Apparatus as set forth in claim 7 wherein the illumination source includes a blackbody source.

9. Apparatus as set forth in claim 5 wherein the determining means includes means for obtaining a Fourier Transform of the line spread function at selected spatial frequencies.

10. A method for determining a modulation transfer function of a radiation detector array that includes a set of radiation detectors that are arranged in rows and columns, comprising the steps of:

operating an illuminating source to selectively illuminate the radiation detector array;

operating the radiation detector array to obtain at least one first plurality of signals from a plurality of detector elements that are disposed along rows and columns of the radiation detector array;

interposing a phased slit reticle between the illumination source and the radiation detector array, the phased slit reticle having at least a first set and a second set of parallel slits, the first set and the second set of parallel slits forming a grid-like pattern and being disposed at a predetermined angular orientation one to another, each of the slits of the first and the second set having a width that, when imaged upon the detector array, is substantially less than a width of a single detector element, the slit illumination source further having a two dimensional phase characteristic between adjacent slits of the first set and the second set that is a function of a distance between adjacent detector elements;

operating the radiation detector array to obtain at least one second plurality of signals from the radiation detector array by illuminating the radiation detector array through the phased slit reticle;

normalizing the at least one second plurality of signals with respect to the at least one first plurality of signals;

selecting a sub-set of detector elements from the radiation detector array, the selected sub-set of radiation detector elements being disposed within an area that includes radiation detector elements within adjacently disposed rows and columns of detector elements, the step of selecting being accomplished in accordance with the expressions:

$$\phi\text{horiz} = IP(((R-R0) + SGN(R-R0)*2.5-0.4/6.1*(C-C0))/6)*0.4 + IP((C-C0 + SGN(C-C0)*2.5)/6)*6.1 + C0 - C$$

and $$\phi\text{vert} = IP(((C-C0) + SGN(C-C0)*2.5-0.4/6.1*(R-R0)/6)*0.4 + IP((R-R0 + SGN(R-R0)*2.5)/6)*6.1 + R0 - R,$$

where $\phi$horiz and $\phi$vert are the spatial dimensions of a horizontal and a vertical line spread function, respectively:

IP represents an integer part:

R and C are the row and column, respectively of the detector element position:

R0 and C0 are the row and column, respectively, of a center location of the line spread function; and SGN( ) indicates the use of the sign of the quantity in ( );

determining a line spread function from the selected sub-set of detector elements using the at least one normalized second plurality of signals; and determining the modulation transfer function from the line spread function.

11. A method as set forth in claim 10 wherein the step of determining the modulation transfer function includes a step of obtaining a Fourier transform of the line spread function over a selected range of spatial frequencies.

12. A method as set forth in claim 10, wherein the step of selecting includes a step of accessing a look-up table to identify radiation detector elements, and wherein the step of determining a line spread function includes a step of measuring an electrical signal that is generated by the identified radiation detector elements.

13. A method for determining a modulation transfer function of a radiation detector array that includes a set of radiation detectors that are arranged in rows and columns comprising the steps of:

operating an illumination source to selectively illuminate the radiation detector array;

operating the radiation detector array to obtain at least one first plurality of signals from a plurality of detector elements that are disposed along rows and columns of the radiation detector array;

interposing a phased slit reticle between the illumination source and the radiation detector array, the phased slit reticle being comprised of an opaque substrate having a plurality of transparent linear features defining first and second sets of parallel slits, the first set and the second set of parallel slits forming a grid-like pattern, wherein said phased slit reticle has the first set of parallel slits equally spaced apart from one another by a distance D1; and has the second set of parallel slits equally spaced apart from one another by a distance D2; wherein the first set of slits and the second set of slits are orthogonaly disposed one to another for defining a two dimensional array of cells, wherein the cells of adjacent columns of the two dimensional array of cells are staggered relative to another by an amount equal to a distance D3, and wherein the cells of adjacent rows of the two dimensional array of cells are overlapped with one another by an amount equal to a distance D4, each of the slits of the first and the second set having a width that, when imaged upon the detector array, is substantially less than a width of a single detector element, the slit illumination source further having a two dimensional phase characteristic between adjacent slits of the first and the second set that is a function of a distance between adjacent detector elements:

operating the radiation detector array to obtain at least one second plurality of signals from the radiation detector array by illuminating the radiation detector array through the phased slit reticle;

normalizing the at least one second plurality of signals with respect to the at least one first plurality of signals;

selecting a sub-set of detector elements from the radiation detector array, the selected sub-set of radiation detector elements being disposed within an area that includes radiation detector elements within adiacently disposed rows and columns of detector elements;

determining a line spread function from the selected sub-set of detector elements using the at least one normalized second plurality of signals; and determining the modulation transfer function from the line spread function.

14. A method as set forth in claim 13 wherein the value of each of D1, D2, D3 and D4 is selected to be a function of the distance between two adjacent detector elements.

15. A method as set forth in claim 10 wherein the step of operating the radiation detector array to obtain the second plurality of signals includes a preliminary step of aligning the interposed phased slit reticle to the detector elements, the step of aligning including the steps of:

illuminating a plurality of detector elements through at least one aperture within the phased slit reticle; and adjusting the phased slit reticle with respect to the illuminated detector elements so as to obtain substantially equal signal outputs from the illuminated plurality of detector elements.

16. A phased slit reticle for use in determining a modulation transfer function of a two-dimensional array of radiation detector elements, comprising:

a first set of parallel slits that are equally spaced apart from one another by a distance D1; and a second set of parallel slits that are equally spaced apart from one another by a distance D2;

wherein each of the slits of the first and the second set having a width that, when imaged upon the two-dimensional array of radiation detector elements, is substantially less than a width of a single radiation detector element;

wherein the first set of slits and the second set of slits are orthogonally disposed one to another for defining a two dimensional array of cells, wherein the cells of adjacent columns of the two dimensional array of cells are staggered relative to another by an amount equal to a distance D3, and wherein the cells of adjacent rows of the two dimensional array of cells are overlapped with one another by an amount equal to a distance D4, and wherein the value of each of D1, D2, D3 and D4 is a function of a distance between two adjacent radiation detector elements of the two-dimensional array of radiation detector elements; and wherein the phased slit reticle is comprised of an opaque substrate having a plurality of transparent linear features defining said first and second sets of parallel slits.

17. A phased slit reticle as set forth in claim 16 wherein the values of D1 and D2 are each equal to 6.1 times the spacing distance between two adjacent radiation detector elements, and wherein the values of D3 and D4 are each equal to 0.4 times the spacing distance between two adjacent radiation detector elements.

18. A phased slit reticle as set forth in claim 16 and further including at least one transparent aperture disposed at a location that is selected for aligning the phased slit reticle to the two dimensional array of radiation detector elements.

* * * * *